United States Patent
Morin

(10) Patent No.: US 10,766,567 B2
(45) Date of Patent: Sep. 8, 2020

(54) CHAIN TRANSMISSION, PARTICULARLY FOR BICYCLES, WITH CONTINUOUSLY VARIABLE TRANSMISSION RATIO

(71) Applicant: Yves Joseph Alfred Morin, San Vittorino (IT)

(72) Inventor: Yves Joseph Alfred Morin, San Vittorino (IT)

( * ) Notice: Subject to any disclaimer, the term of this patent is extended or adjusted under 35 U.S.C. 154(b) by 266 days.

(21) Appl. No.: 15/765,057

(22) PCT Filed: Oct. 3, 2016

(86) PCT No.: PCT/IB2016/055905
§ 371 (c)(1),
(2) Date: Mar. 30, 2018

(87) PCT Pub. No.: WO2017/056076
PCT Pub. Date: Apr. 6, 2017

(65) Prior Publication Data
US 2018/0290710 A1    Oct. 11, 2018

(30) Foreign Application Priority Data
Oct. 2, 2015   (IT) .......................... 102015000057739

(51) Int. Cl.
*B62M 9/08*        (2006.01)
*F16H 55/54*     (2006.01)
(Continued)

(52) U.S. Cl.
CPC ................. *B62M 9/08* (2013.01); *F16H 9/24* (2013.01); *F16H 55/30* (2013.01); *F16H 55/54* (2013.01)

(58) Field of Classification Search
CPC .. B62M 9/08; F16H 9/10; F16H 55/54; F16H 9/24; B62D 55/125
(Continued)

(56) References Cited

U.S. PATENT DOCUMENTS 524,830 A * 8/1894 Leggo, Jr. ............... F16H 55/54
474/56
593,285 A * 11/1897 Van Eyck ................ B62M 9/08
474/57
(Continued)

FOREIGN PATENT DOCUMENTS

DE    102010019045    11/2011
FR         2476256      8/1981
(Continued)

OTHER PUBLICATIONS

International Search Report dated Feb. 20, 2017, from International Application No. PCT/IB2016/055905, 5 pages.
(Continued)

*Primary Examiner* — Henry Y Liu

(57) ABSTRACT

The transmission comprises a chainring (12) rotatable around an axis of rotation (x), at least one sprocket (13) and a chain (14) for transmitting to said at least one sprocket (13) the rotary motion of the chainring (12) around the axis of rotation (x). The chainring (12) comprises a disc (16) and a plurality of meshing devices (22; 122) which are mounted in radially movable manner on the disc (16) and are arranged to enable engagement of the disc (16) with the chain (14) for transmitting motion from the chainring (12) to the at least one sprocket (13) by means of the chain (14). The transmission further comprises shifting means (18, 60) for varying the radial position of the meshing devices (22; 122) in order to change the transmission ratio with which the chainring (12) transmits motion to the at least one sprocket (13). Each meshing device (22; 122) comprises a support body (24; 124) and a tilting fork (28; 128) which is supported on the respective support body (24; 124) for tilting around a first tilting axis (x') parallel to the axis of rotation (x) of the chainring (12), and comprises at least one tooth (28a; 128a) for engaging a link (14a) of the chain (14). Each
(Continued)

meshing device (22; 122) further comprises braking means (32, 38, 40; 132, 138, 140, 178) for preventing the respective tilting fork (28; 128) from tilting around the first tilting axis (x').

12 Claims, 14 Drawing Sheets

(51) Int. Cl.
  *F16H 9/24* (2006.01)
  *F16H 55/30* (2006.01)
(58) Field of Classification Search
  USPC .................................................. 474/49
  See application file for complete search history.

(56) References Cited

U.S. PATENT DOCUMENTS

| | | | | |
|---|---|---|---|---|
| 724,449 A * | 4/1903 | Dumaresq | ................ | F16H 9/10 474/53 |
| 724,450 A * | 4/1903 | Dumaresq | ................ | F16H 9/10 474/53 |
| 740,829 A * | 10/1903 | Dumaresq | ................ | F16H 9/10 474/53 |
| 1,633,746 A * | 6/1927 | Jereczek | ............. | B62D 55/125 474/163 |
| 1,650,449 A * | 11/1927 | Jaeger | ................ | F16H 9/24 474/53 |
| 2,161,913 A * | 6/1939 | Doyle | ................ | F16H 7/06 474/163 |
| 2,584,447 A * | 2/1952 | Hayot | ................ | F16H 9/24 474/50 |
| 2,827,797 A * | 3/1958 | Bell | ................ | B62M 3/06 74/325 |
| 3,800,613 A * | 4/1974 | Clark | ................ | F16H 9/24 474/54 |
| 3,850,044 A * | 11/1974 | Hagen | ................ | B62M 9/08 474/56 |
| 3,850,045 A * | 11/1974 | Hagen | ................ | B62M 9/08 474/56 |
| 3,867,851 A * | 2/1975 | Gregory | ................ | B62M 9/08 474/56 |
| 3,956,944 A * | 5/1976 | Tompkins | ................ | B62M 9/08 474/50 |
| 3,969,948 A * | 7/1976 | Pipenhagen, Jr. | ....... | B62M 9/08 474/50 |
| 3,995,508 A * | 12/1976 | Newell | ................ | B62M 9/08 474/50 |
| 4,167,124 A * | 9/1979 | Zvetkov | ................ | F16H 9/24 474/53 |
| 4,257,519 A * | 3/1981 | Leach | ................ | F16H 55/30 198/834 |
| 4,260,386 A * | 4/1981 | Frohardt | ................ | B62M 9/08 280/238 |
| 4,342,559 A * | 8/1982 | Williams | ................ | F16H 9/10 474/47 |
| 4,373,926 A * | 2/1983 | Fullerton | ................ | F16H 9/10 474/56 |
| 4,493,678 A * | 1/1985 | Husted | ................ | B62M 9/08 474/164 |
| 4,516,960 A * | 5/1985 | Rathert | ................ | F16H 55/54 474/47 |
| 4,521,207 A * | 6/1985 | Husted | ................ | F16H 9/10 474/164 |
| 4,759,739 A * | 7/1988 | Weir | ................ | F16H 9/10 474/49 |
| 4,787,879 A * | 11/1988 | Pritchard | ................ | B62M 9/08 474/49 |
| 4,832,660 A * | 5/1989 | Leonard | ................ | B62M 9/08 474/49 |
| 4,836,046 A * | 6/1989 | Chappel | ................ | B62M 9/08 280/236 |
| 4,850,939 A * | 7/1989 | Chilcote | ................ | B62M 9/08 474/49 |
| 4,875,894 A * | 10/1989 | Clark | ................ | F16H 9/10 474/49 |
| 4,878,883 A * | 11/1989 | Wheless | ................ | F16H 55/54 474/51 |
| 4,952,196 A * | 8/1990 | Chilcote | ................ | B62M 9/08 474/70 |
| 4,961,719 A * | 10/1990 | Wildermuth | ............. | B62M 9/08 474/50 |
| 4,990,123 A * | 2/1991 | Krude | ................ | F16H 9/10 474/50 |
| 5,582,555 A * | 12/1996 | Miller | ................ | F16H 9/10 474/148 |
| 5,685,794 A * | 11/1997 | Willmot | ................ | B62M 9/08 475/170 |
| 5,772,546 A * | 6/1998 | Warszewski | ............ | B62M 9/08 474/50 |
| 5,984,814 A * | 11/1999 | Davenport | ............... | B62M 9/08 474/50 |
| 6,332,852 B1 * | 12/2001 | Allard | ................ | B62M 9/08 474/49 |
| 6,431,573 B1 * | 8/2002 | Lerman | ................ | B62M 9/14 280/261 |
| 6,893,369 B2 * | 5/2005 | Fuerle | ................ | F16H 9/24 474/162 |
| 9,855,993 B2 * | 1/2018 | Rockwood | ............. | B62M 9/08 |
| 2004/0198542 A1 * | 10/2004 | Fuerle | ................ | F16H 9/24 474/162 |
| 2005/0233846 A1 * | 10/2005 | Green | ................ | F16H 55/54 474/47 |
| 2007/0243969 A1 * | 10/2007 | Siman-Tov | ............... | F16H 9/24 476/5 |
| 2010/0062885 A1 * | 3/2010 | Naude | ................ | F16H 9/14 474/49 |
| 2016/0114858 A1 * | 4/2016 | Magee | ................ | B62M 25/08 474/49 |

FOREIGN PATENT DOCUMENTS

| | | |
|---|---|---|
| FR | 2664956 | 1/1992 |
| WO | 9404411 | 3/1994 |
| WO | 9823481 | 6/1998 |

OTHER PUBLICATIONS

Written Opinion of the International Searching Authority from International Application No. PCT/IB2016/055905, 6 pages.

* cited by examiner

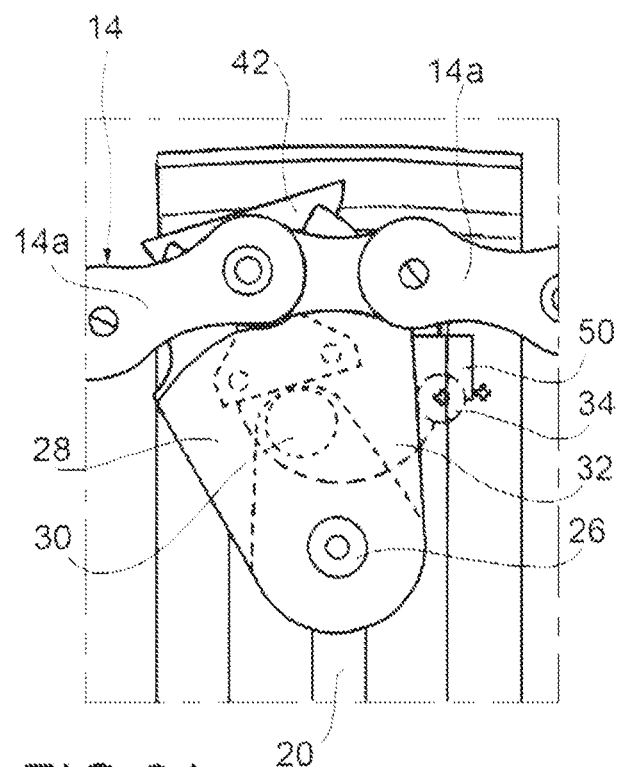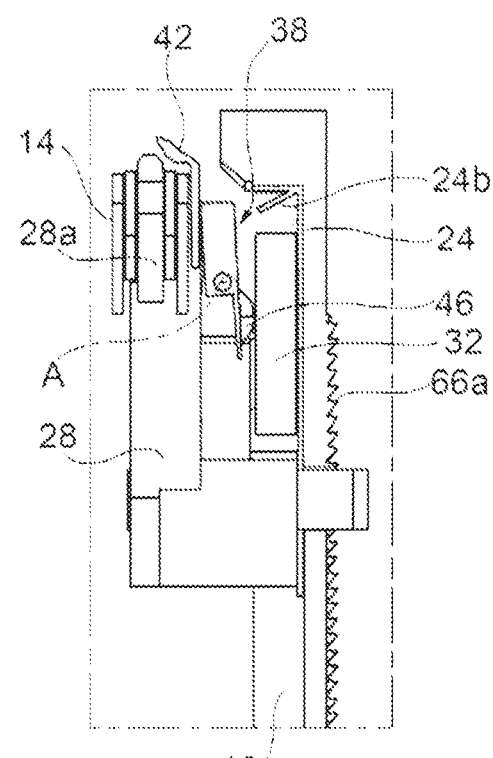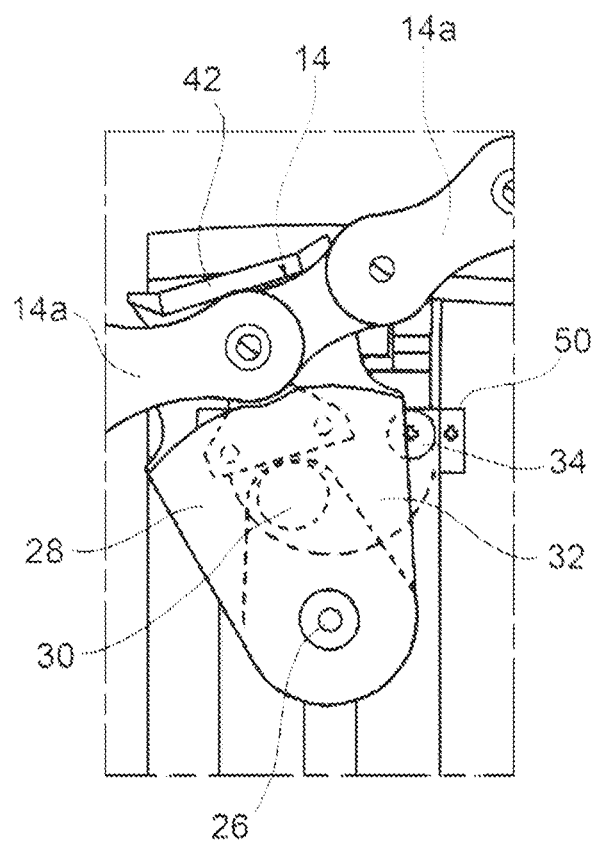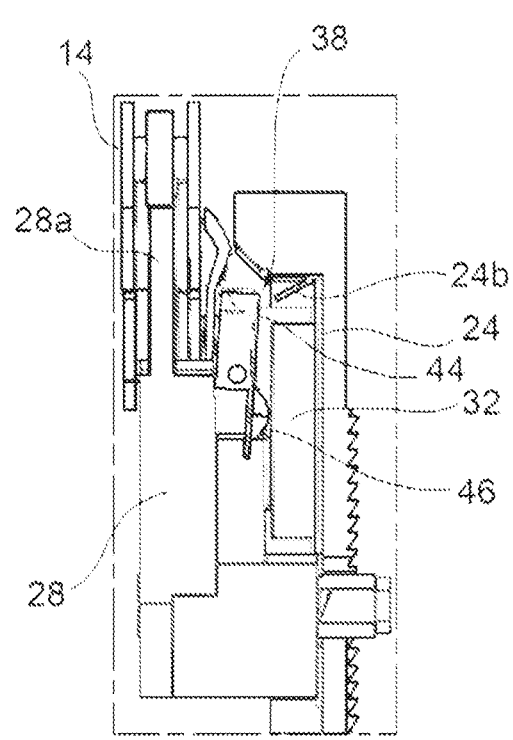

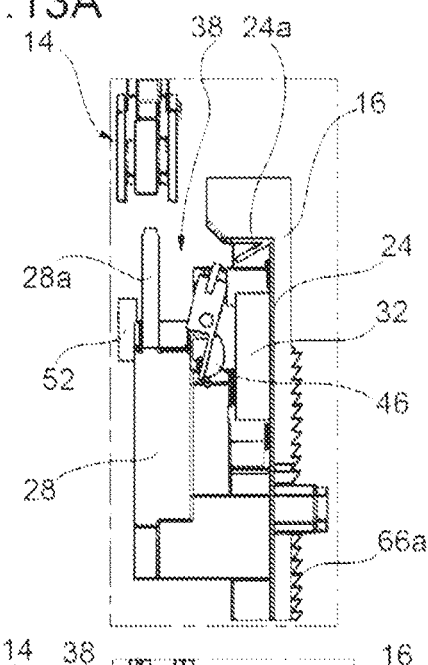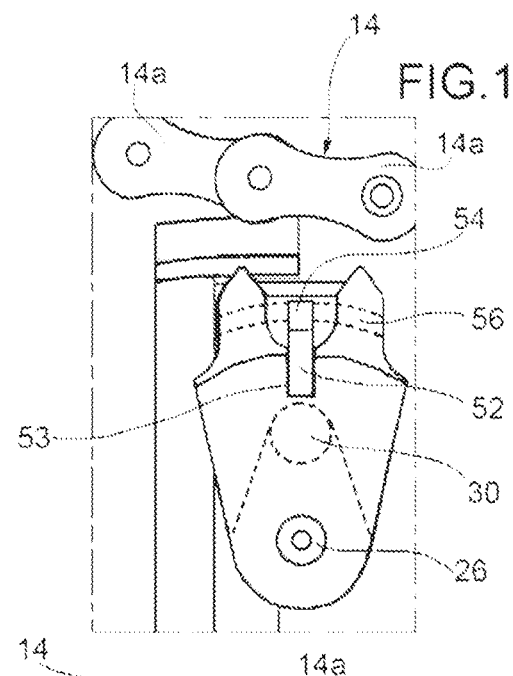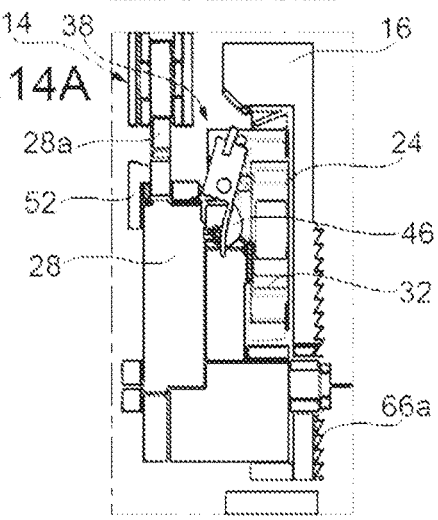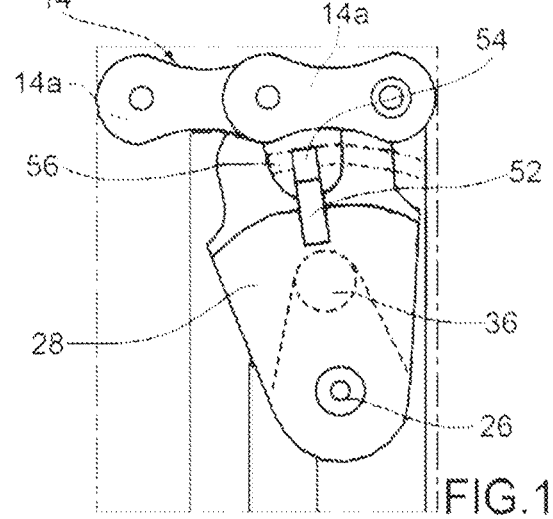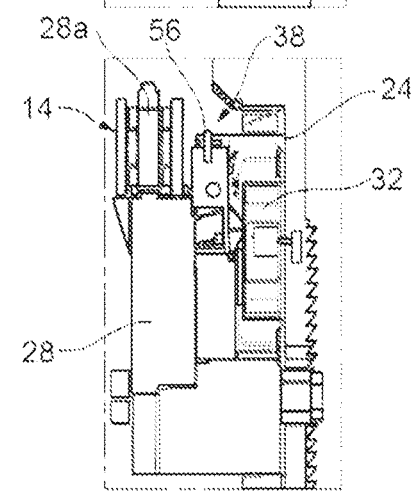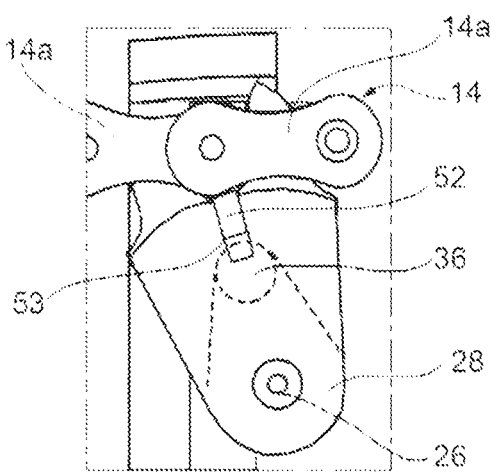

CHAIN TRANSMISSION, PARTICULARLY FOR BICYCLES, WITH CONTINUOUSLY VARIABLE TRANSMISSION RATIO

TECHNICAL FIELD

The present invention relates in general to the field of mechanical transmissions. More precisely, the present invention refers to a chain transmission, particularly for bicycles, allowing to continuously vary the transmission ratio.

PRIOR ART

It is known to use, particularly in chain mechanical transmissions, systems for changing the transmission ratio which adopt solutions for modifying the chain's radius when passing over a single chainring, so as to avoid the need to resort to a plurality of chainrings.

An example of a system of this type, applied to a bicycle chain transmission, is known from document DE 3932342, where a slotted disc is proposed which has a plurality of slots arranged in a spiral, in which forks engaging with the chain are slidably received. In this way, the forks can be radially moved to vary the chain's radius. This known system, however, has little flexibility, since it does not make it possible to vary the maximum distance that can be reached by the fork from the centre of the disc. The forks are in fact forced to follow the path of the slots in the disc, which have a fixed size that cannot be modified, and therefore the travel of the forks with respect to the disc will always follow the same path, without the possibility of being modified and thus of varying the transmission ratio between the disc of the chainring and the rear sprocket.

A chain transmission having the characteristics specified in the preamble of the attached independent claim 1 is known from US 2004/198542. According to this known solution, the forks are supported by a driving wheel so that each of them is able to tilt around a respective tilting axis parallel to the axis of rotation of the wheel. The tilting of the forks with respect to the driving wheel is opposed by means of springs. This entails a reduction in the efficiency of the transmission, since part of the energy is dissipated by compression of the springs.

SUMMARY OF THE INVENTION

It is an object of the present invention to solve the aforementioned problems, providing a chain transmission with continuously variable transmission ratio which has a higher efficiency than the prior art.

This and other objects are fully achieved according to the invention by virtue of a transmission having the characteristics specified in independent claim 1.

Advantageous embodiments of the invention are the subject matter of the dependent claims, whose content is to be understood as forming an integral and integrating part of the description which follows.

In short, the invention is based on the idea of providing a transmission in which each tilting fork is connected to respective braking means capable of hindering the tilting of the tilting fork around its own tilting axis. Since the tilting forks are locked, wastage of power is avoided and thus the total efficiency of the transmission is maximized.

According to a further aspect of the present invention, the transmission comprises a system for varying the radial travel of the tilting forks with respect to the chainring, thus varying the transmission ratio between the chainring and the sprocket, by means of a shifter in which a curved track is formed which delimits a path along which the tilting forks move. Following the path defined by the curved track, the tilting forks move with respect to the centre of the chainring, moving towards it or away from it, until they are located in the desired radial position to provide the chain with the selected diameter. The shifter can also be radially moved with respect to the chainring, so as to vary the dynamics with which the sliders associated to the tilting forks move towards or away from the centre of the chainring. Thanks to this solution, it is possible to continuously change the positioning of the tilting forks, and consequently to continuously vary the transmission ratio.

BRIEF DESCRIPTION OF THE DRAWINGS

The structural and functional characteristics of preferred embodiments of a mechanical chain transmission with continuously variable ratio according to the invention will now be described with reference to the attached drawings, in which:

FIGS. 7A to 10B are schematic views of a succession of stages of operation of the meshing device according to FIGS. 5 and 6;

FIGS. 13A to 15B are schematic views of a succession of stages of operation of the meshing device according to FIGS. 1 and 12;

DETAILED DESCRIPTION OF EMBODIMENTS OF THE INVENTION

Figure 1:
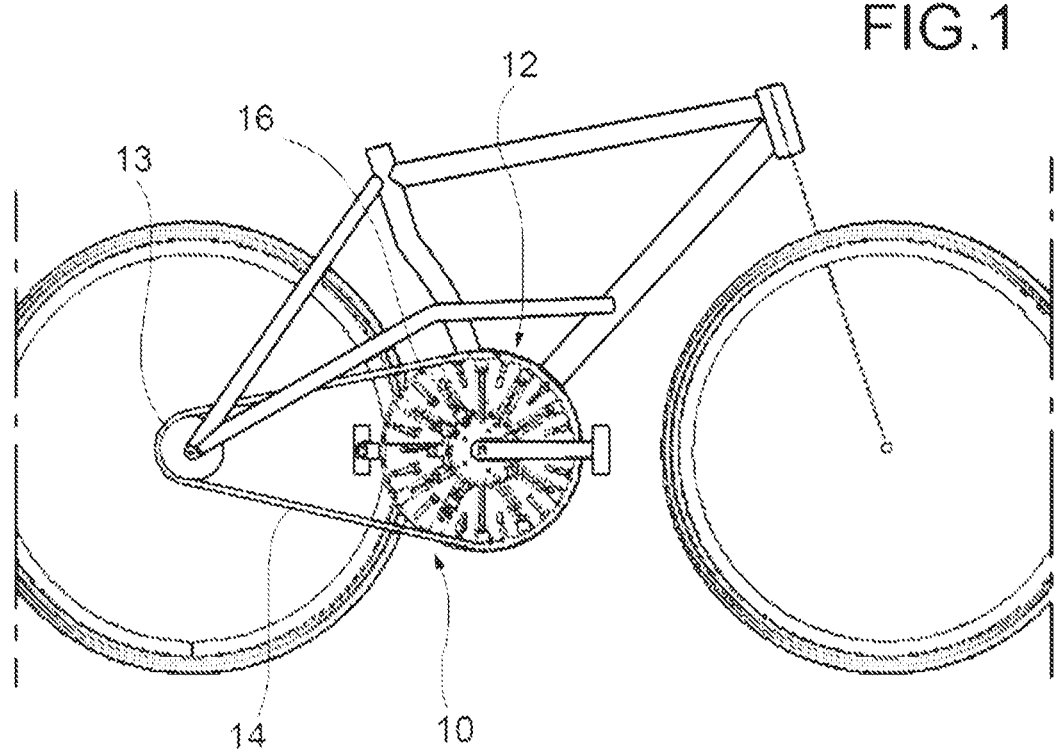
FIGS. 1 and 2 are schematic lateral views, from opposite sides, of a bicycle using a chain transmission according to an embodiment of the present invention.
Figure 2:
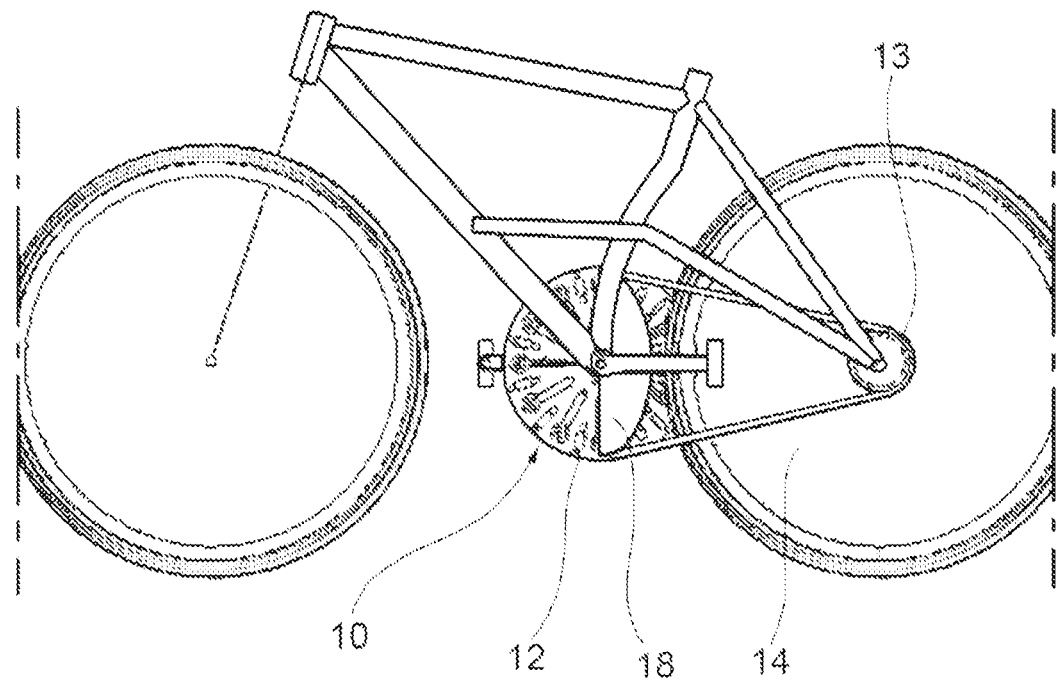
Figure 3:
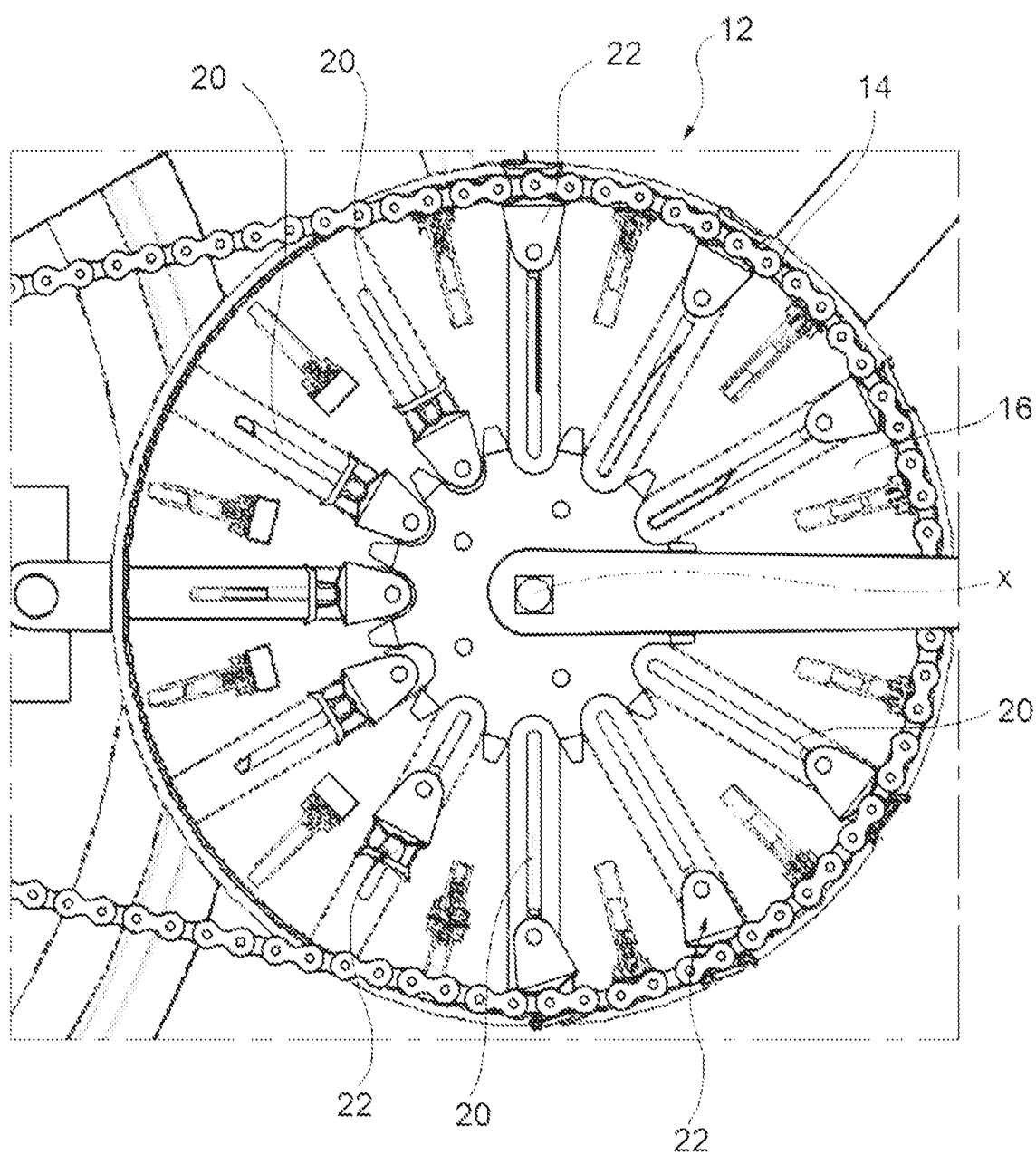
FIGS. 3 and 4 are schematic lateral views, from opposite sides, of a chainring of the transmission of FIGS. 1 and 2.
Figure 4:
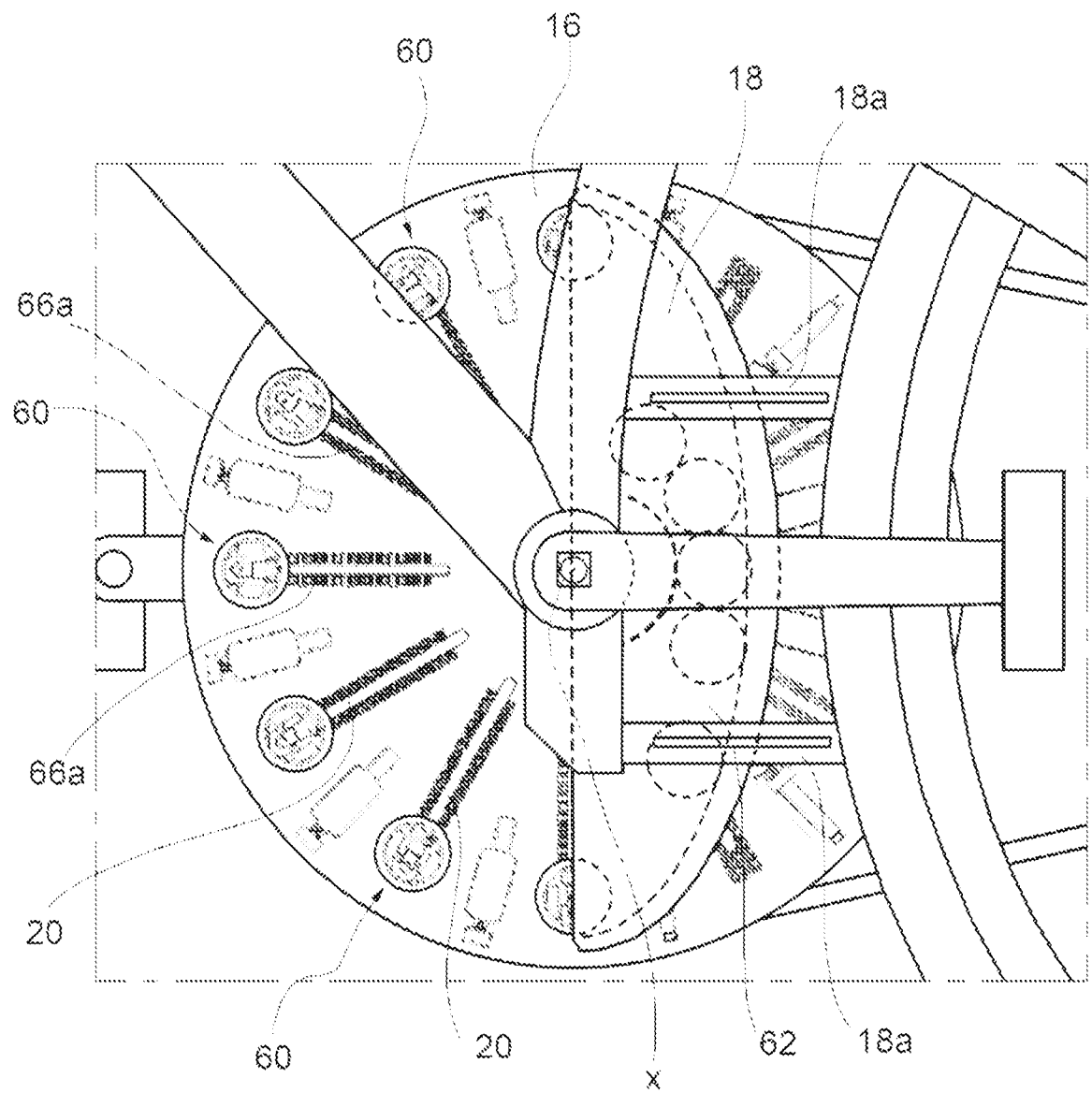

Before explaining in detail a plurality of embodiments of the invention, it must be clarified that the application of the invention is not limited to the constructional details and the configuration of the components set forth in the following description or shown in the drawings. The invention can be carried out according to other embodiments than those here proposed. It must also be understood that the phraseology and terminology here used have a purely descriptive purpose and must not be taken as limiting the scope of protection of the invention.

FIG. 1 of the attached drawings shows in its entirety a mechanical chain transmission 10 applied to a bicycle. The transmission 10 basically comprises a driving wheel or chainring 12, one or more sprockets 13 and a chain 14 by means of which the chainring 12 is connected to the sprocket(s) 13.

The chainring 12 comprises a disc 16 rotatable around an axis of rotation x. The disc 16 carries a plurality of radially movable meshing devices 22 which allows engagement between the chainring 12 and the chain 14 for the transmission of torque from the chainring 12 to the sprocket(s) 13 by means of the chain 14, as will be better appreciated in the remaining part of the description.

Figure 5:
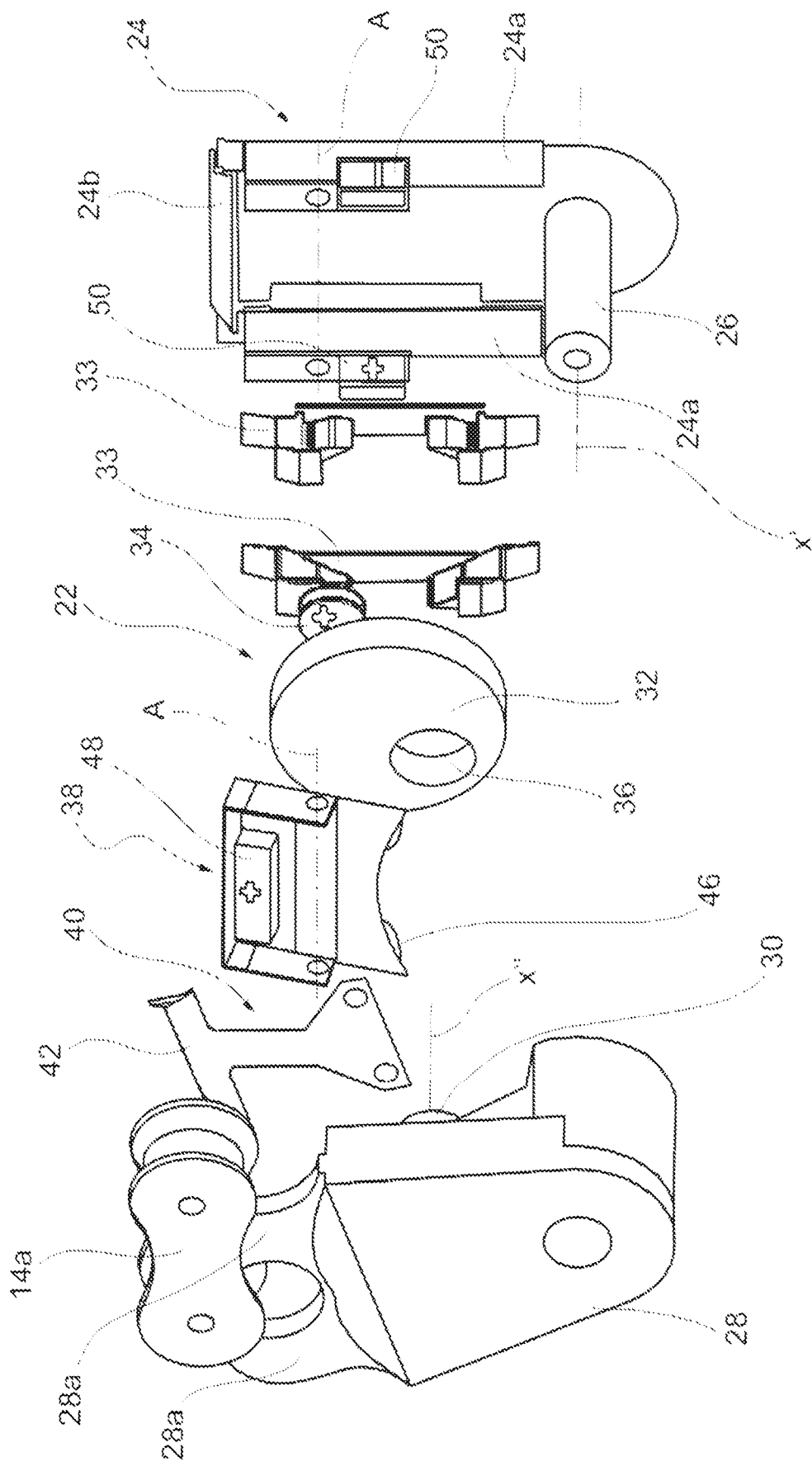
FIGS. 5 and 6 are exploded views schematically showing a meshing device of a chain transmission according to the present invention.
Figure 6:
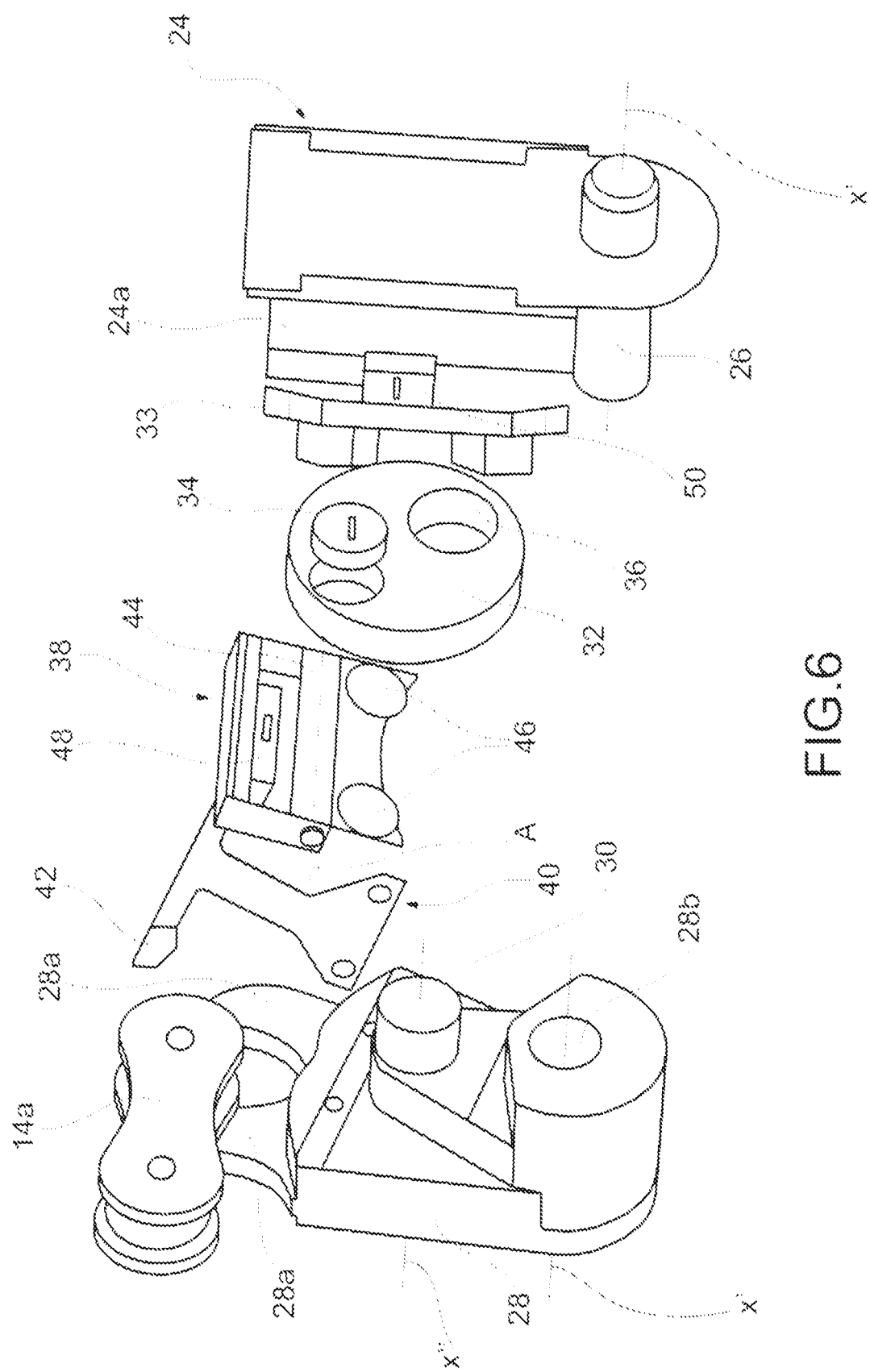

As shown in FIGS. 5 and 6, each meshing device 22 comprises a support casing 24 on which a tilting fork 28 is supported by means of a pin 26 so as to be tiltable around a tilting axis x'. The tilting axis x' of the tilting fork 28 (coinciding with the axis of pin 26) is oriented parallel to the axis of rotation x of the disc 16 of the chainring 12, which in case of application of the transmission to a bicycle coincides with the axis of the bottom bracket, i.e. the axis of rotation of the pedal cranks. The tilting fork 28 is provided with at least one tooth 28a (in the embodiment here proposed, a pair of teeth 28a) for engaging a link 14a of the chain 14. Each meshing device 22 further comprises a tilting member 32, for example in the form of a disc, which is interposed between the support body 24 and the tilting fork 28. The tilting member 32 is mounted in tilting manner on the tilting fork 28, by means of a pin 30, around a tilting axis x". The tilting axis x" of the tilting member 32 (coinciding with the axis of the pin 30) is oriented parallel to the tilting axis x' of the tilting fork 28. More specifically, the pin 30 is inserted into an eccentric hole 36 in the tilting member 32.

Still with reference to FIGS. 5 and 6, each meshing device 22 further comprises braking means for preventing the tilting fork 28 from tilting around its own tilting axis x'. More precisely, the braking means are associated to the tilting member 32 to prevent this member and, in this way, also the tilting fork 28, from tilting, in order to enable the transmission of torque from the chainring 12 to the chain 14 by means of the meshing device 22.

The braking means comprise a braking member 38, which is supported by the support body 24 and is interposed between the tilting fork 28 and the tilting member 32. The braking member 38 is tiltable around a tilting axis A, extending perpendicular to the tilting axes x' and x" of the tilting fork 28 and of the tilting member 32, between a first position (or rest position), in which the braking member 38 is not in contact with the tilting member 32, and a second position (or working position), in which the braking member 38 is in contact with the tilting member 32 so as to prevent the latter from tilting around the respective tilting axis x". The movement of the braking member 38 between the aforesaid first and second positions takes place by means of a control member 40. More specifically, the braking member 38 has a face 44 facing towards the tilting member 32, on which there are locking elements 46 for engaging the tilting member 32 to prevent the latter from tilting around the respective tilting axis x". According to an embodiment of the invention, the locking elements 46 are formed by projections made of rubber or other friction material, which are urged against the tilting member 32 when the braking member 38 is in the second position.

Still with reference to FIGS. 5 and 6, according to an embodiment of the invention, on the braking member 38, on the tilting member 32 and on the support body 24 there are mounted respectively an outer magnet 48, an intermediate magnet 34 and a pair of inner magnets 50 (or alternatively only one inner magnet 50). The magnets 48, 34 and 50 are arranged in such a manner that the intermediate magnet 34 is attracted by the outer magnet 48, mounted on the braking member 38, and repelled by the inner magnets 50 mounted on the support body 24. The magnets 48, 34 and 50 cooperate with each other to angularly position the tilting member 32 so as to properly orient the tilting fork 28 with respect to the chain link 14a. The inner magnets 50 are housed in lateral tabs 24a of the support body 24, in symmetrical positions and outside the tilting member 32. The inner magnets 50 have opposite polarity to that of the intermediate magnet 34 and therefore exert a repelling force tending to move the tilting member 32 back into the angular position it takes when the tilting fork 28 does not engage the chain link 14a. Furthermore, advantageously the lateral tabs 24a can rotatably support the braking member 38 which is thus also drivingly connected with the support body 24. According to an embodiment, stabilizers 33 are housed between the lateral tabs 24a of the support body 24, so as to form a seat in which the tilting member 32 is received.

Preferably, the control member 40 has an elastic spacer 42 which projects so as to be spaced from the face 44 of the braking member 38. In the embodiment illustrated in FIGS. 5 and 6, the control element 40 has an approximately T-like shape, with a vertical branch which is connected to the brake member 38 and which is preferably made flat and flexible, to be inserted into the gap between the braking member 38 and the tilting fork 28, and with a horizontal branch which forms the elastic spacer 42. The elastic spacer 42 projects upwards from the teeth 28a of the tilting fork 28, so as to cover the chain 14 when the latter is fully engaged by these teeth.

FIGS. 7A to 10B show a series of operating steps with which the meshing device 22 (made according to the example illustrated in FIGS. 5 and 6) engages with a chain link 14a.

Figure 7A:
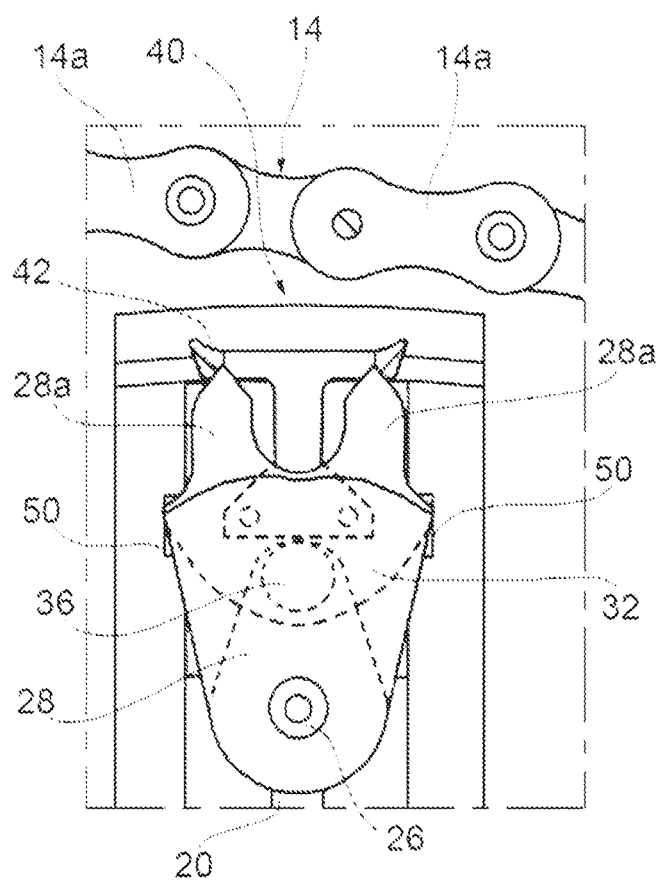
Figure 7B:
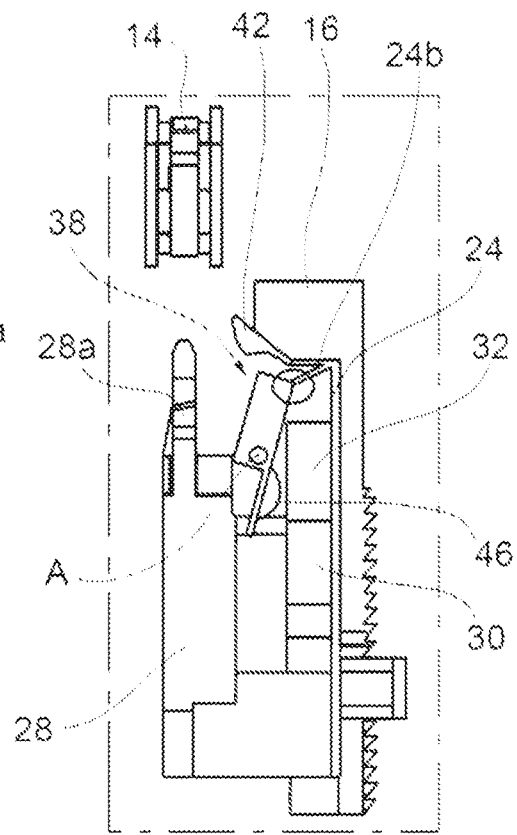

In an initial phase, illustrated in FIGS. 7A and 7B, the tilting fork 28 is in a rest position, since the chain 14 is not yet close to the teeth 28a of this fork. In this condition the braking member 38 is in the first position, in which it abuts against a projection 24b of the support body 24. Furthermore, in this condition the outer magnet 48, which is mounted on the braking member 38, attracts to itself (i.e. upwards, according to the point of view of a person observing FIG. 7B) the intermediate magnet 34 associated to the tilting member 32. Therefore, in this initial phase the tilting member 32 is in such a position that the tilting fork 28 associated thereto is kept oriented in a radial direction (i.e. a vertical direction, according to the point of view of a person observing FIG. 7A).

Figure 8A:
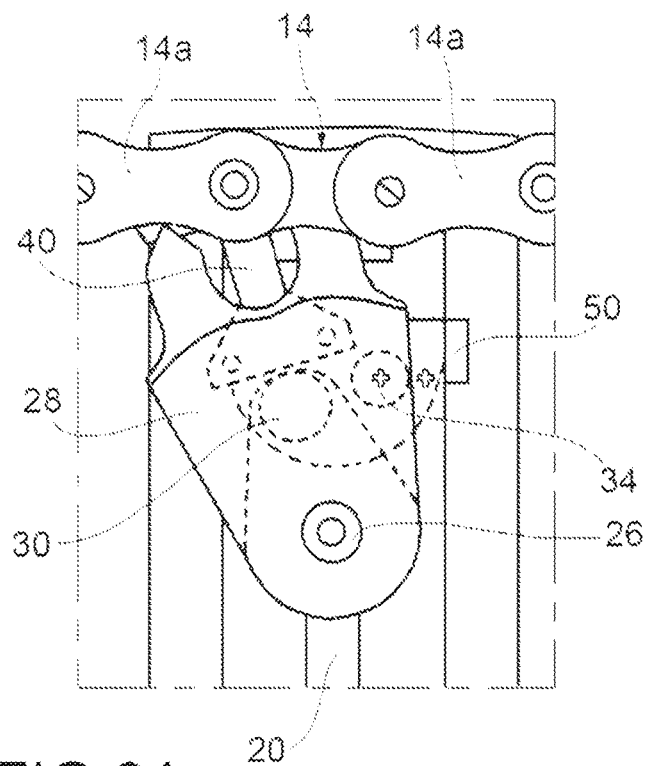
Figure 8B:
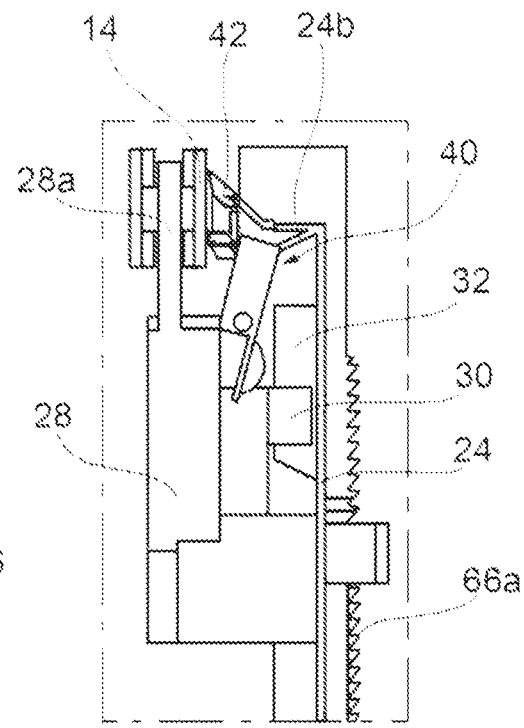

As the chain approaches the teeth 28a of the tilting fork 28, as illustrated in FIGS. 8A and 8B, the teeth begin to mesh with the chain link 14a. Consequently, the tilting fork 28 tilts, making the tilting member 32 rotate and bringing the intermediate magnet 34 close to one of the two inner magnets 50. In this condition the outer magnet 48, which is mounted on the braking member 38, is attracted by the chain 14, but the elastic spacer 42 goes into abutment against the chain 14 and thus prevents the braking member 38 from moving from the first position, in which it leaves the tilting member 32 free to tilt around its own tilting axis x", to the second position, in which it prevents the tilting member 32 from tilting around its own tilting axis x".

When the chain 14 fully meshes with the teeth 28a, the elastic spacer 42 passes over the chain, as may be seen in FIGS. 9A and 9B. In this condition the outer magnet 48 attracts the braking member 38 towards the chain 14, with the consequence that the braking member 38 rotates around the transverse tilting axis A, thus bringing the locking elements 46 into contact with the tilting member 32. In this way, further tilting of the tilting member 32 around its own tilt axis x" is prevented and consequently also the tilting fork 28 is kept locked in position. The tilting fork 28 is now able to transmit traction forces to the chain 14, as it is kept drivingly connected with the support body 24 by means of the braking member 38.

FIGS. 10A and 10B illustrate the condition of incipient disengagement of the chain 14 from the tilting fork 28. In particular, they show that the elastic spacer 42 begins to deform so as to slide alongside the chain 14. In this way, the braking member 38 begins to move away from the tilting member 32, until it returns into abutment against the projection 24b when the chain 14 has moved away sufficiently, thrusting back the elastic spacer 42. In this condition, the outer magnet 48 attracts the intermediate magnet 34, bringing the tilting fork 28 back into the central starting position.

Figure 11:
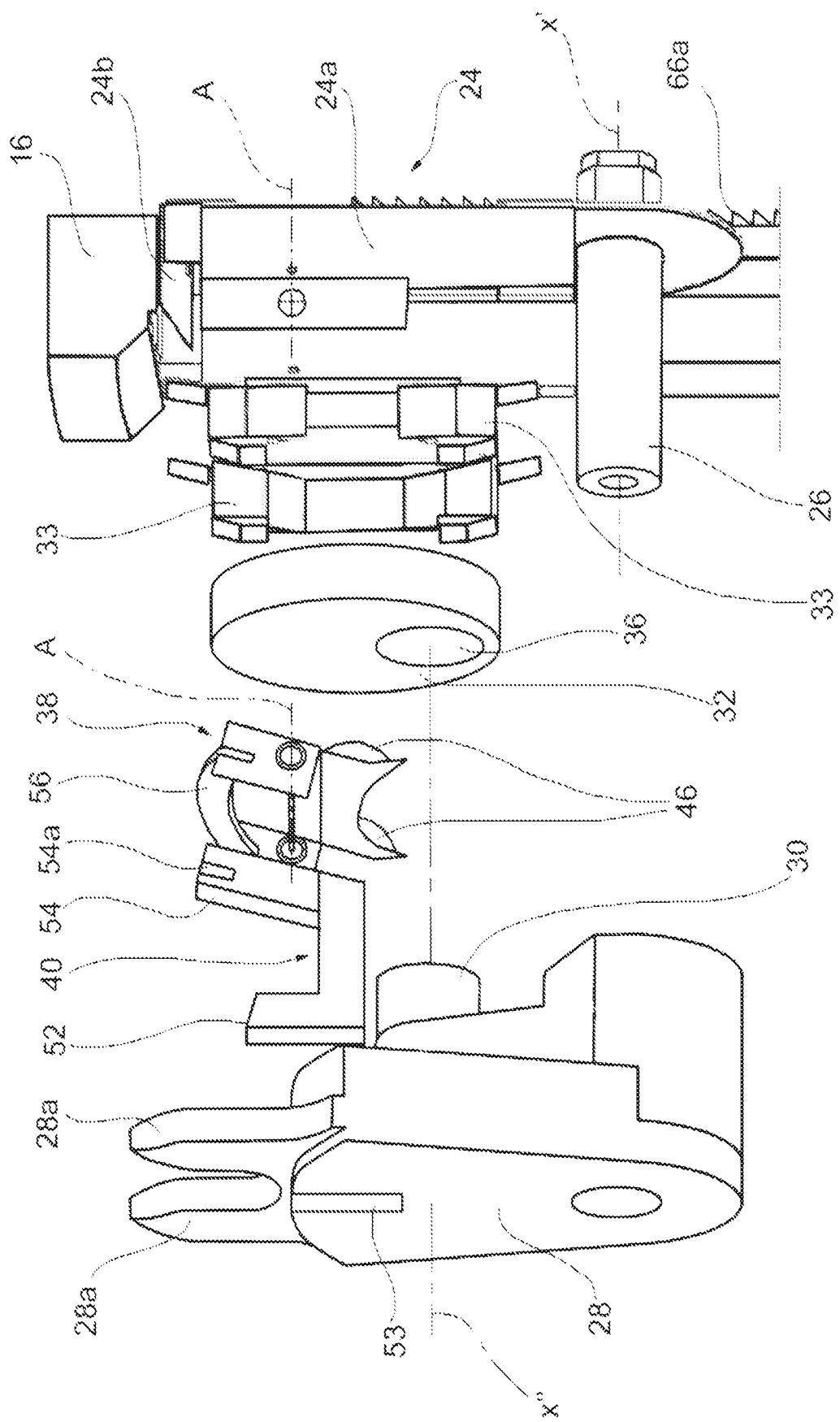
FIGS. 11 and 12 are exploded views schematically showing a further embodiment of a meshing device of a chain transmission according to the present invention.
Figure 12:
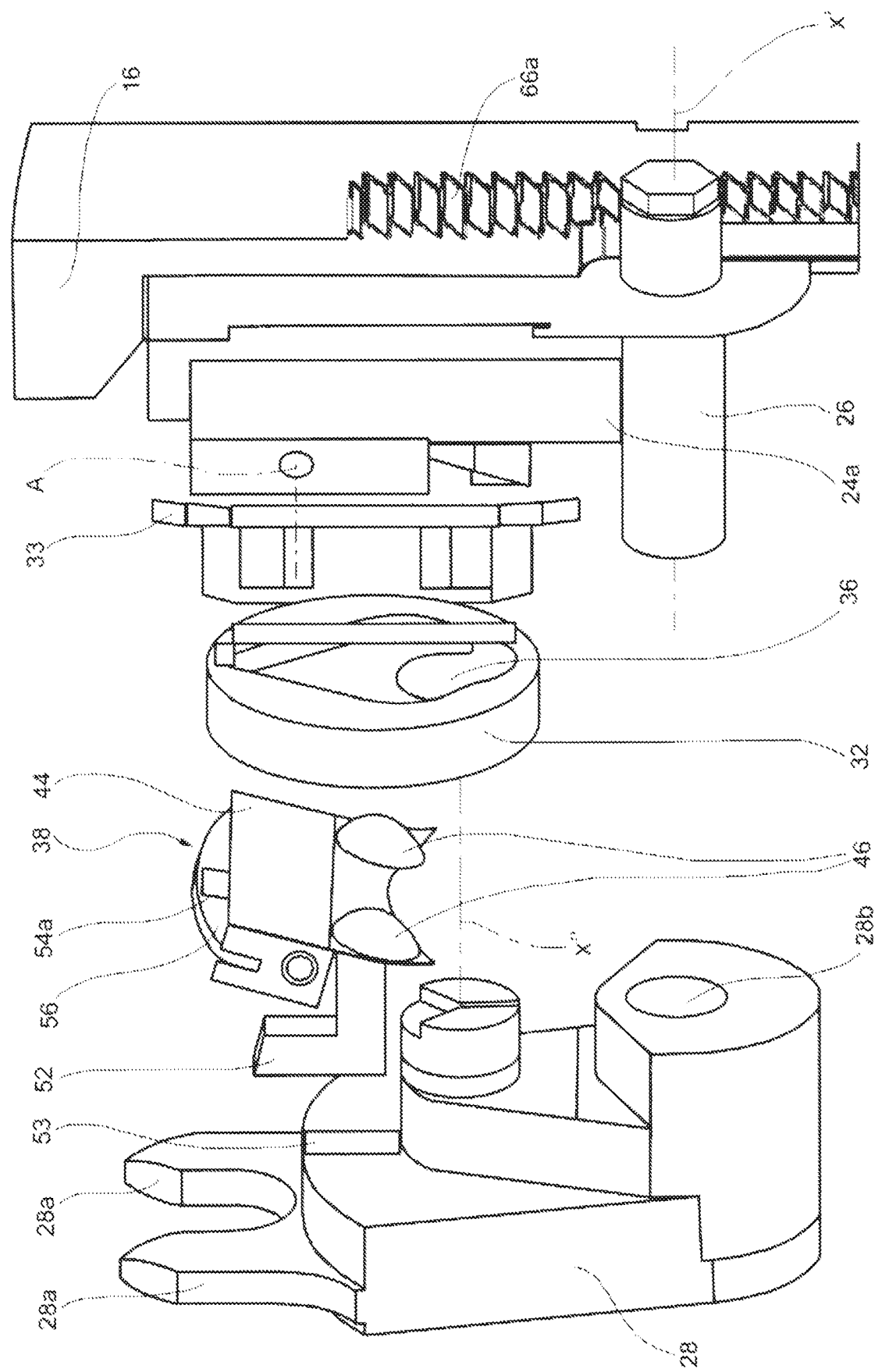

FIGS. 11 and 12 illustrate a variant embodiment of the meshing device 22, according to which mechanical members are provided instead of the magnets 48, 34 and 50.

According to this variant embodiment, the control element 40 is a lever having an end 52 arranged on the opposite side from the braking member 38. This end 52 can pass through a slot 53 in the body of the tilting fork 28 and project centrally from the latter or, according to an alternative solution not illustrated, project laterally from the tilting fork 28. The opposite end 54 (i.e. the brake-side end) of the control element 40 is, on the other hand, connected to the braking member 38, for example by engagement of a curved rib 56 of the braking member 38 in a slot 54a of the control element 40. In this way, the control element 40, which is drivingly connected for tilting with the tilting fork 28, does not drag the braking member 38 in rotation but, when the end 52 is pressed by the chain link 14a, pulls the braking member 38 towards the tilting fork 28, activating the braking action. In other words, the chain link 14a brings down the end 52 of the control element 40 projecting from the tilting fork 28, thus pulling the braking member 38 towards the chain 14. Consequently, the braking member 38 rotates around the transverse tilting axis A so as to engage with the tilting member 32. Preferably, in order to oppose the tilting of the tilting member 32 an elastic element, for example a spring, is provided instead of a magnet as in the above illustrated embodiment.

FIGS. 13A to 15B illustrate a succession of operative steps, during which the meshing device 22 according to FIGS. 11 and 12 engages with the chain 14 and the braking member 38 moves from the rest position to the working position.

FIGS. 13A and 13B illustrate the condition in which the chain 14 is still at a distance from the tilting fork 28 and the braking member 38 is in abutment against the projection 24a on the support body 24 and is therefore disengaged from the tilting member 32.

As the chain 14 approaches, as shown in FIGS. 14A and 14B, the tilting fork 28 is angularly repositioned. The control element 40 follows the tilting of the fork 28, sliding on the curved rib 56 without dragging the braking member 38 in rotation.

When the chain 14 is fully meshed with the teeth 28a of the tilting fork 28, as shown in FIGS. 15A and 15B, the end 52 of the control element 40 projecting from the tilting fork 28 is urged downwards, attracting and triggering the braking member 38 by means of the other end 54. Similarly to what happens with the embodiment of the meshing device 22 according to FIGS. 5 and 6, the different inclination of the braking member 38 brings the locking elements 46 into contact with the tilting member 32, thus preventing the tilting member 32, and therefore the tilting fork 28, from rotating and allowing the transmission of torque from the tilting fork 28 to the chain 14.

Figure 16:
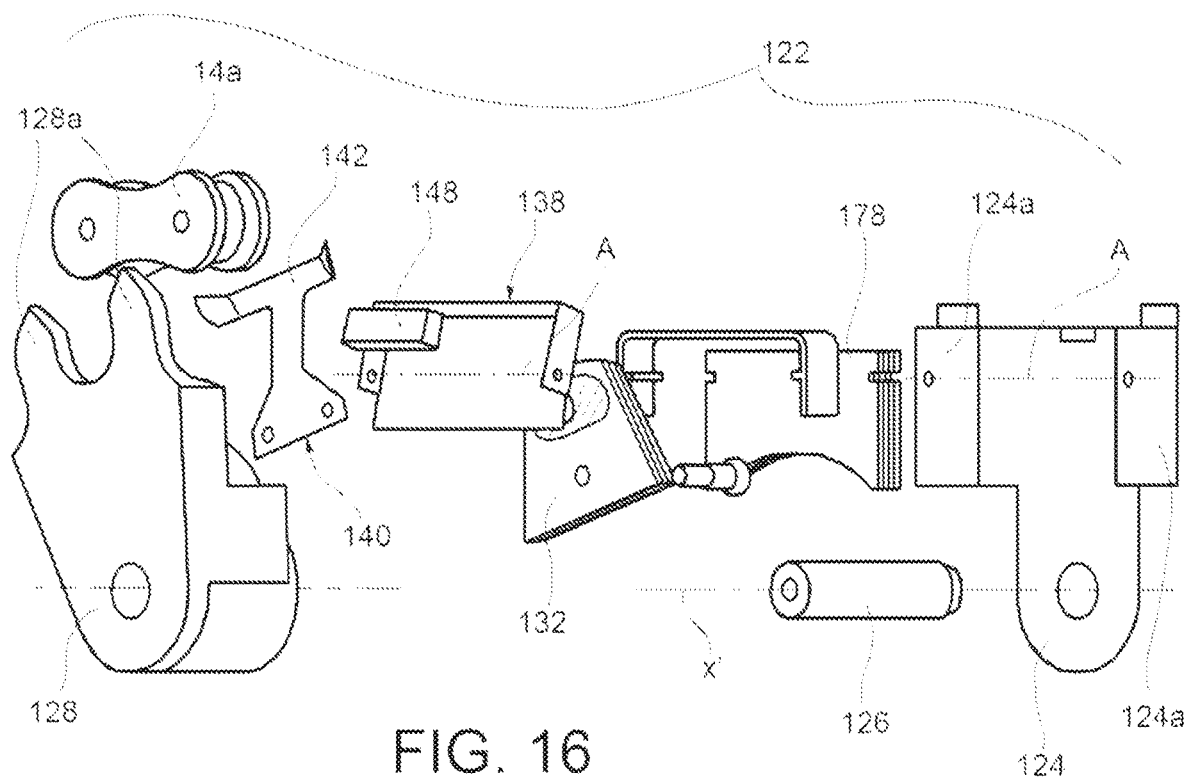
FIGS. 16 and 17 are exploded views schematically showing two further embodiments of a meshing device of a chain transmission according to the present invention.
Figure 17:
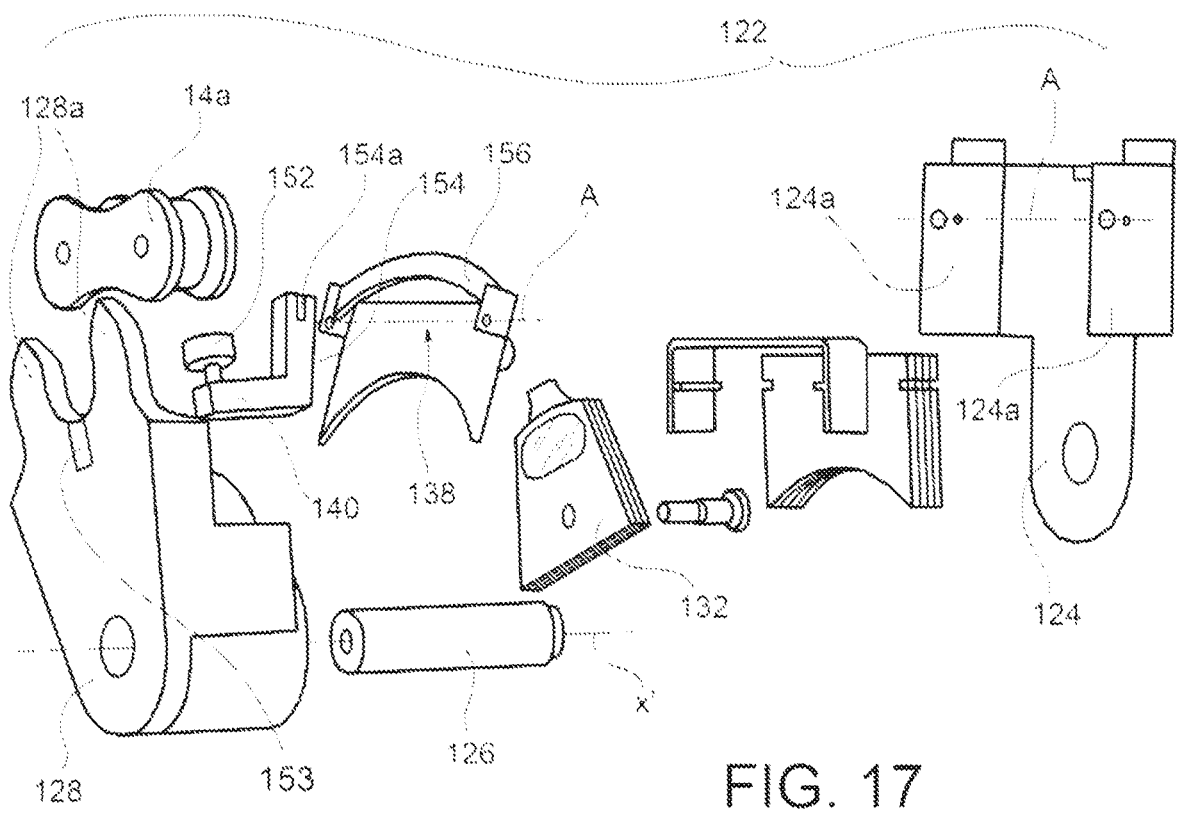
Figure 18:
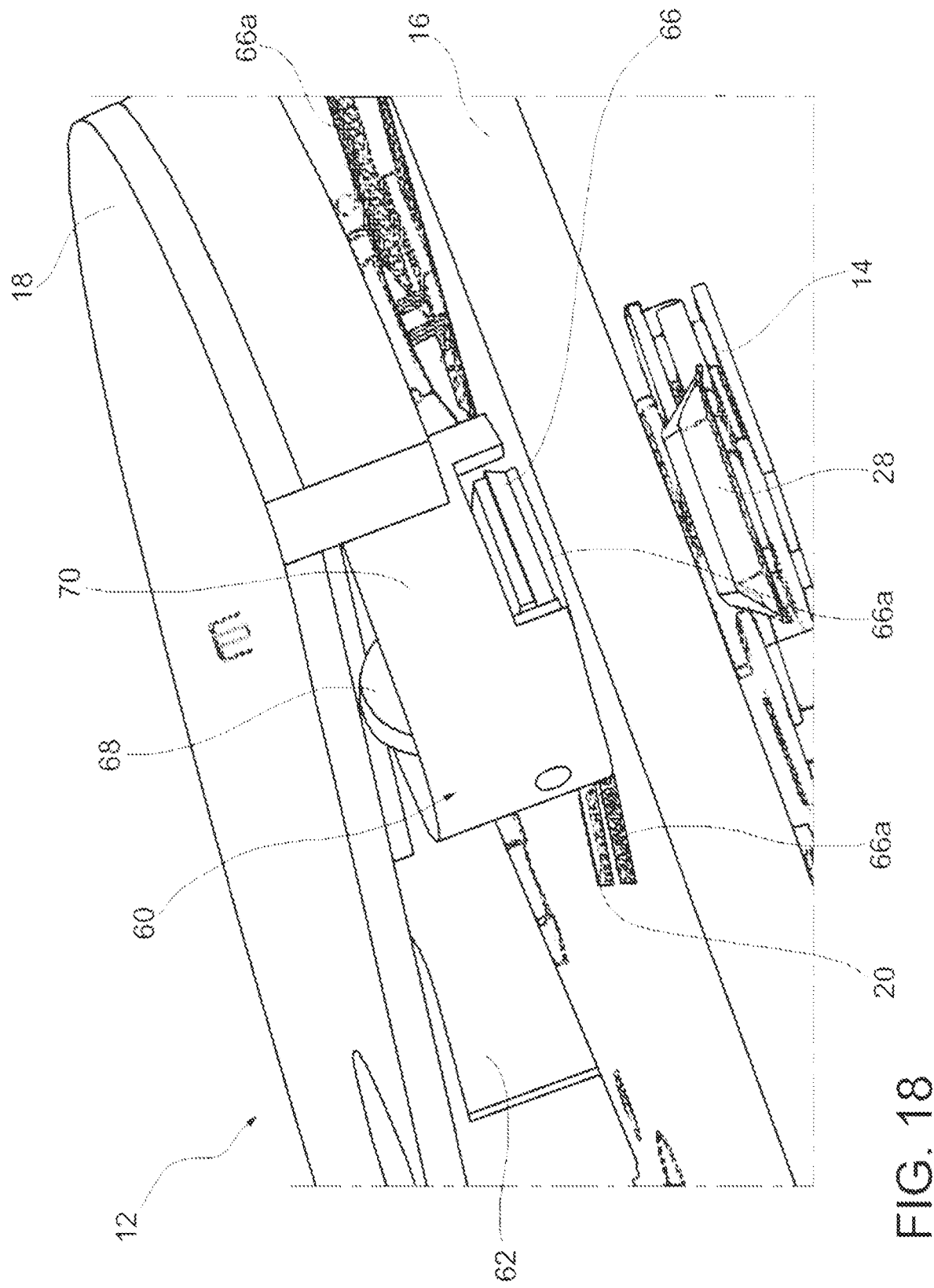
FIG. 18 is a schematic perspective view of a system for varying the radial position of sliders on the chainring of a transmission according to an embodiment of the present invention.
Figure 19:
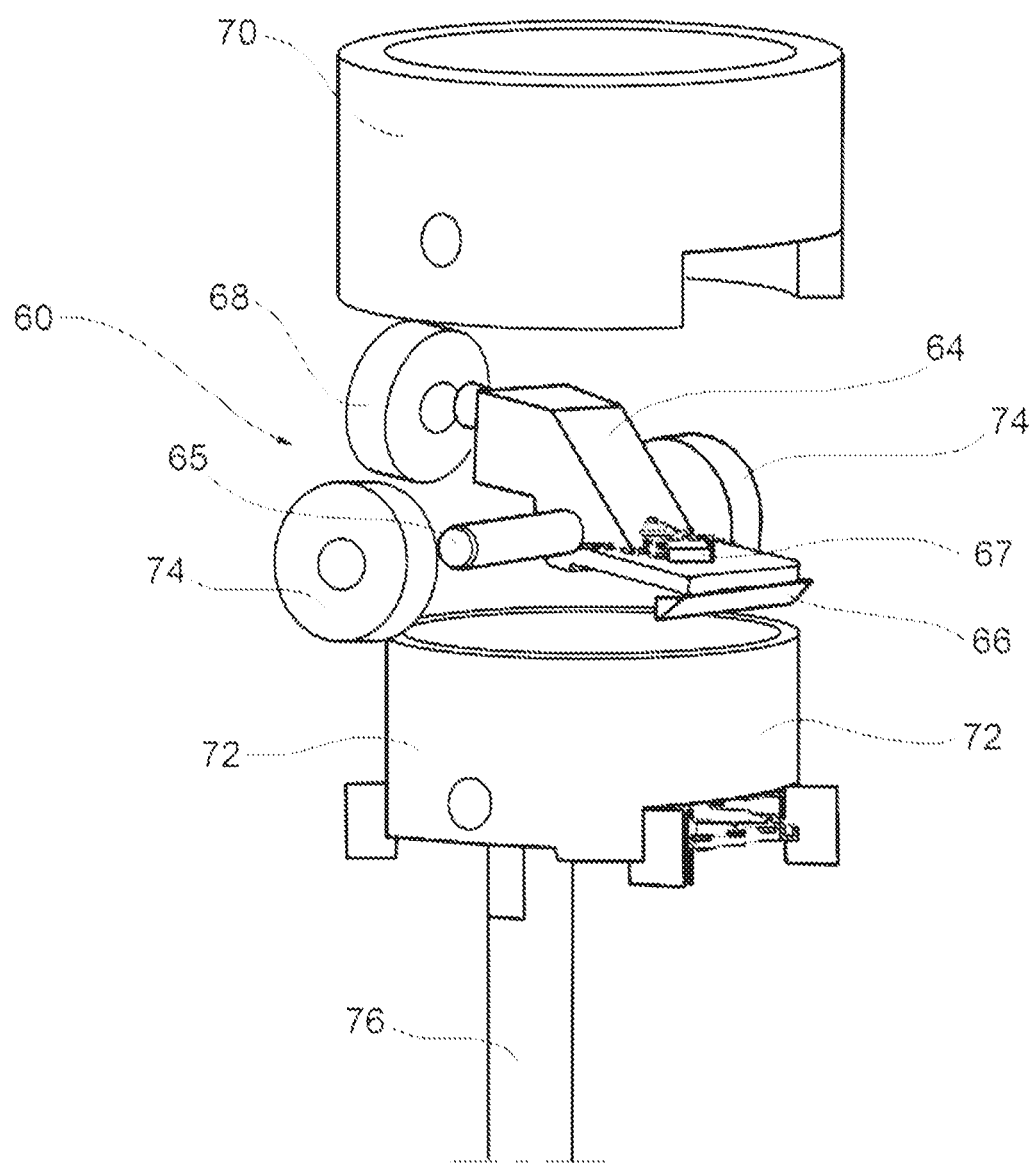
FIG. 19 is an exploded view schematically showing a slider of the system of FIG. 18.

Two further embodiments of a meshing device according to the invention are illustrated in FIGS. 16 and 17 of the attached drawings, where parts and elements identical or corresponding to those of FIGS. 5, 6, 11 and 12 have been given the same reference numerals, increased by 100.

These two further embodiments differ from those previously described with reference to FIGS. 5 and 6 and to FIGS. 11 and 12, respectively, in the way the tilting fork is prevented from tilting. In this case, in fact, the locking of the tilting fork, indicated 128, takes place thanks to the fact that a first pack of plates 132 provided with friction linings, which is supported by the tilting fork 128 so as to be drivingly connected therewith for tilting around the tilting axis x', is pressed by means of the braking member 138 against a second pack of plates 178 provided with friction linings, which is mounted on the support body 124 so as to be drivingly connected therewith. The plates of the first pack of plates 132 are interposed between the plates of the second pack of plates 178. In the example shown the first pack of plates 132 has three plates, while the second pack of plates 178 has four plates, so that each plate of the first pack of plates 132 is interposed between a pair of adjacent plates of the second pack of plates 178. Naturally, the two packs of plates 132 and 178 might, however, have a number of plates other than that proposed here. In this case, too, the braking member 138 is supported by the support body 124, and specifically between the tilting fork 128 and a first plate of the second pack of plates 178, and is tiltable around a tilting axis A perpendicular to the tilting axis x' of the tilting fork 128 between a first position (or rest position) in which the braking member 138 does not press the plates of the first pack of plates 132 and of the second pack of plates 178 against each other, thus allowing the tilting fork 128 to tilt around the tilting axis x', and a second position (or working position) in which the braking member 138 presses the plates of the first pack of plates 132 and of the second pack of plates 178 against each other, thus preventing the tilting fork 128 from tilting around the tilting axis x'. The movement of the braking member 138 between the first and second positions takes place by means of a control member 140.

The braking member 138 and the control member 140 according to the embodiment of FIG. 16 have a structure and operation similar to those of the embodiment of FIGS. 5 and 6. Therefore, also in this case a magnet 148 mounted on the braking member 138 tends to attract the braking member 138 towards the chain link 14a, and hence to move the braking member 138 from the first to the second position. The movement of the braking member 138 from the first to the second position is opposed by the control element 140, in particular by the elastic spacer 42 of the latter.

The braking member 138 and the control element 140 according to the embodiment of FIG. 17, on the other hand, have a structure and operation similar to those of the embodiment of FIGS. 11 and 12. Therefore, also in this case the movement of the braking member 138 from the first to the second position for locking of the tilting fork 128 is brought about by interaction of the control element 140, which is made in the form of a lever, with a curved rib 156 of the braking member 138, as previously explained with reference to the embodiment of FIGS. 11 and 12.

With reference finally to FIGS. 3, 4, 18, 19 and 20, the disc 16 of the chainring 12 is provided with sliders 60 which are associated to the meshing devices 22 (which may equally well be made as shown in FIGS. 5 and 6, as shown in FIGS. 11 and 12, as shown in FIG. 16 or even as shown in FIG. 17) to allow movement of the latter in a radial direction. The sliders 60 are slidably arranged in respective radial guides 20 formed in the disc 16 of the chainring 12 and are caused to shift along these guides by means of a shifter 18, which in the example illustrated has the shape of a half-moon. The shifter 18 is arranged facing the disc 16, on the opposite side from the chain 14. By causing the shifter 18 to move along respective rails 18a integral with the bicycle's frame (FIG. 4), it is possible to modify the radial position of the sliders 60 with respect to the disc 16. The positioning of the shifter 18 along the rails 18a can be adjusted in discrete manner, by means for example of the operation of a selector lever by the user, or in continuous manner, by means of a control system which varies the transmission ratio according to predetermined logics (thus providing an actual continuously variable transmission). The shifter 18 has at least one curved guide 62, facing the disc 16, in which the sliders 60 are slidably arranged. By passing through the curved guide 62, the sliders 60 move radially closer to or farther from the centre of the disc 16.

Each slider 60 comprises a rocking lever 64, having on an arm thereof a coupling device which engages the chainring 12 and radially locks the slider 60 in the desired position, i.e. the radial position which ensures the preselected transmission ratio. The coupling device is preferably formed by a wedge 66 meshing with teeth 66a which are provided on the disc 16 and are spaced a certain distance apart in a direction parallel to the radial guides 20. Each tooth 66a corresponds, therefore, to a given radial position in which the slider 60 can be stopped. Conveniently, a magnetic button 67 can be associated to the wedge 66 to ensure a greater locking force (as in FIG. 19), and/or to attract the wedge 66 towards the disc 16, when the tilting of the rocking lever 64 brings about the lifting of the wedge 66.

Figure 20:
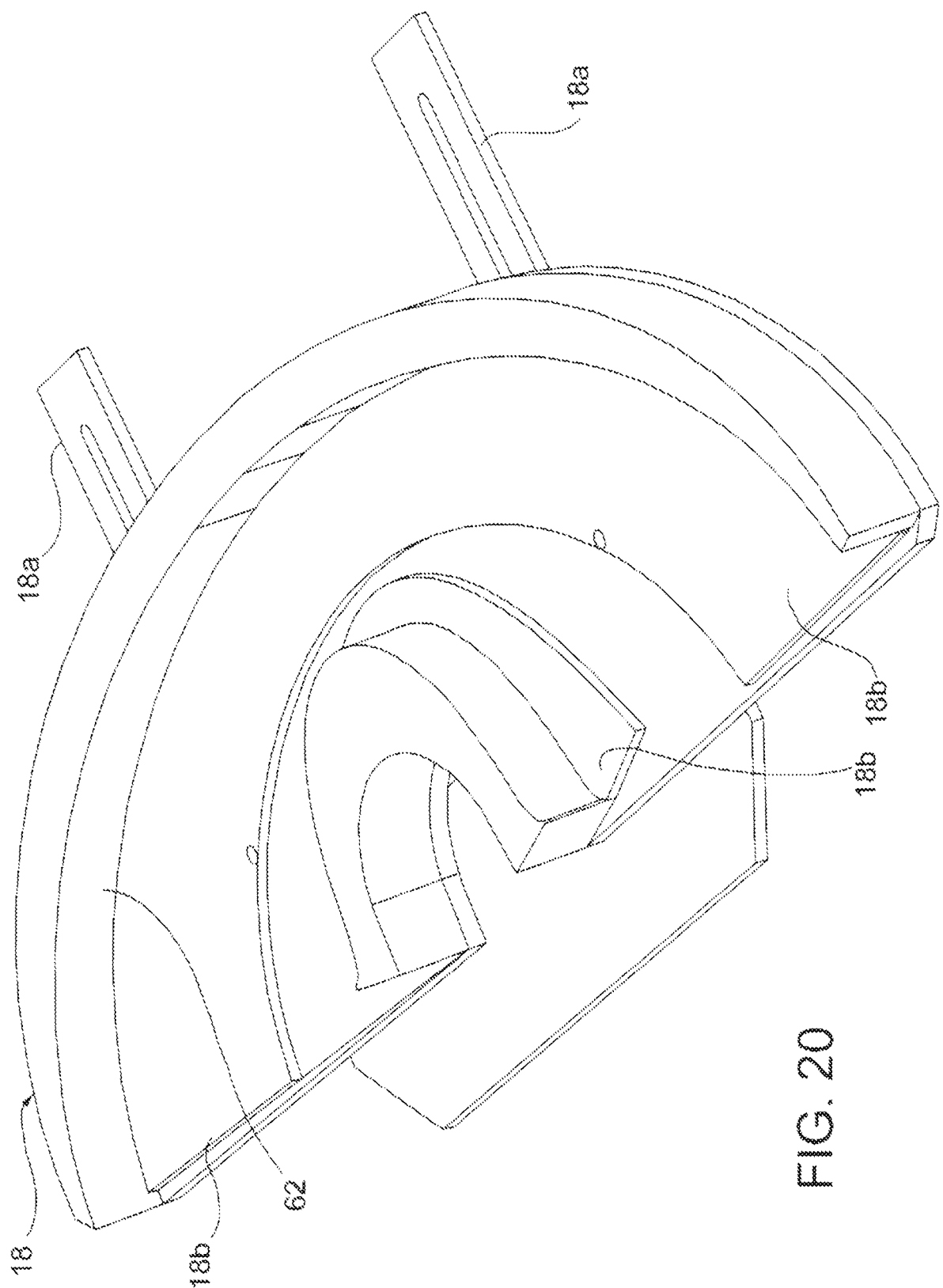
FIG. 20 is a schematic perspective view of a shifter of the system of FIG. 18.

Preferably, a disengagement roller 68 is rotatably mounted on the arm of the rocking lever 64 opposite the arm carrying the wedge 66, in such a manner that when the disengagement roller 68 is urged towards the disc 16, the wedge 66 is lifted and disengaged from the disc 16 and the slider 60 is therefore free to slide radially with respect to the disc 16. The rocking lever 64 is in fact pivoted in an intermediate position on a pin 65, and therefore lowering of the arm which carries the disengagement roller 68 causes the lifting of the wedge 66 and its disengagement from the tooth 66a, thereby radially unlocking the respective slider 60. Conveniently, the lowering of the disengagement roller 68 can be achieved by providing the shifter 18 with a variable thickness (as shown in FIG. 20, where the zones of greater thickness are indicated 18b), in such a manner that when the disengagement roller 68 rolls over a section with greater thickness, it receives a downwards thrust which causes the disengagement of the slider 60 from the disc 16.

According to an embodiment, each sliders 60 comprises a respective cylindrical housing 70 arranged to slide along the side walls of the curved guide 62. For example, the cylindrical housing 70 can be made of teflon, to improve sliding along the curved guide 62. Secondary rollers 74 can be rotatably mounted, for example on the intermediate pin 65, to make radial sliding of the slider 60 on the chainring 12 easier. Optionally, a cylindrical sleeve 72 may contain the rocking lever 64 and have radial holes with the intermediate pin 65 passing therethrough, so that the secondary rollers 74 are inside this cylindrical sleeve 72. The entire assembly can be contained in the cylindrical housing 70, as may be seen in FIGS. 18 and 19.

A peg 76, projecting from the slider 60, can pass through the disc 16 and connect the slider 60 for example to a respective meshing device 22 provided with a tilting fork 28.

As will be evident from the above description, the present invention provides a reliable and very efficient torque transmission system, which is easily adjustable for continuously setting the desired transmission ratio and which makes it possible to vary the transmission ratio without interruption in the transmission of torque. Furthermore, the transmission according to the present invention can be used independently of the direction of rotation of the chainring.

Various aspects and embodiments have been described of a mechanical transmission with continuously variable transmission ratio. It must be understood that each embodiment can be combined with any other embodiment here described. Furthermore, the invention is not limited to the embodiments here described, but may be varied within the scope defined by the attached claims.

The invention claimed is:

1. A mechanical transmission comprising a chainring rotatable around an axis of rotation (x), at least one sprocket and a chain for transmitting to said at least one sprocket the rotary motion of the chainring around the axis of rotation (x), wherein the chainring comprises a disc and a plurality of meshing devices which are mounted in radially movable manner on the disc and are arranged to enable engagement of the disc with the chain for transmitting motion from the chainring to said at least one sprocket by means of the chain, wherein the transmission further comprises a shifting device for varying the radial position of the meshing devices in order to change the transmission ratio with which the chainring transmits motion to said at least one sprocket, wherein each meshing device comprises a support body and a tilting fork which is tiltably supported on the respective support body around a first tilting axis (x') parallel to the axis of rotation (x) of the chainring and comprises at least one tooth for engaging a link of the chain, wherein each meshing device further comprises a braking device for preventing the respective tilting fork from tilting around said first tilting axis (x'), wherein said shifting device comprises a plurality of sliders, which are each drivingly connected to a respective meshing device and are movable along respective radial guides provided in the disc, and a shift member axially juxtaposed, and radially shiftable, with respect to the disc, wherein each slider comprises a rocking lever on one arm of which there is provided a coupling device arranged to engage the disc and radially lock the slider when said slider is in a predetermined radial position, and wherein said shift member includes at least one curved guide facing the disc, in which the sliders are slidable in such a manner that said sliders, passing through the curved guide, move radially towards or away from the centre of the disc.

2. The transmission of claim 1, wherein a disengagement roller is rotatably mounted on an arm of the rocking lever opposite the arm carrying the coupling device, in such a manner that when the disengagement roller is urged towards the disc, the coupling device is disengaged from the disc and the slider is free to slide radially with respect to the disc.

3. The transmission of claim 2, wherein the shift member has a variable thickness, so that when the disengagement roller rotates over a thicker section of the shift member said disengagement roller receives a downwards thrust which causes the disengagement of the slider from the disc.

4. The transmission of claim 1, wherein the sliders comprise a cylindrical housing arranged to slide along side walls of the curved guide.

5. A mechanical transmission comprising a chainring rotatable around an axis of rotation (x), at least one sprocket and a chain for transmitting to said at least one sprocket the rotary motion of the chainring around the axis of rotation (x),
- wherein the chainring comprises a disc and a plurality of meshing devices which are mounted in radially movable manner on the disc and are arranged to enable engagement of the disc with the chain for transmitting motion from the chainring to said at least one sprocket by means of the chain,
- wherein the transmission further comprises a shifting device for varying the radial position of the meshing devices in order to change the transmission ratio with which the chainring transmits motion to said at least one sprocket,
- wherein each meshing device comprises a support body and a tilting fork which is tiltably supported on the respective support body around a first tilting axis (x') parallel to the axis of rotation (x) of the chainring and comprises at least one tooth for engaging a link of the chain,
- wherein each meshing device further comprises a braking device for preventing the respective tilting fork from tilting around said first tilting axis (x'),
- wherein said braking device comprises:
  - a tilting member supported in tiltable manner on the tilting fork around a second tilting axis (x'') parallel to said first tilting axis (x'),
  - a braking member which is supported on the support body for tilting around a third tilting axis (A) normal to said first and second tilting axes (x', x'') between a first position, in which the braking member does not engage with the tilting member, and a second position, in which the braking member engages with the tilting member so as to prevent the tilting member from tilting, and
  - a control element operatively connected to the braking member to control the movement of the braking member between said first and second positions.

6. The transmission of claim 5, wherein said tilting member is a disc-shaped member supported eccentrically by the tilting fork to tilt around said second tilting axis (x'').

7. The transmission of claim 6, wherein the braking member of each meshing device has a face facing towards the tilting disc on which there are locking elements arranged to be urged against the tilting disc to prevent the latter from tilting.

8. The transmission of claim 6, wherein on the braking member, on the tilting disc and on the support body of each meshing device there are mounted an outer magnet, an intermediate magnet and at least one inner magnet, respectively, in such a manner that the intermediate magnet is attracted by the outer magnet and repelled by said at least one inner magnet.

9. The transmission of claim 5, wherein the control element of each meshing device comprises an elastic spacer arranged to cooperate with the chain to cause movement of the braking member from said first position to said second position when the chain is fully meshed with said at least one tooth of the tilting fork.

10. A mechanical transmission comprising a chainring rotatable around an axis of rotation (x), at least one sprocket and a chain for transmitting to said at least one sprocket the rotary motion of the chainring around the axis of rotation (x),
- wherein the chainring comprises a disc and a plurality of meshing devices which are mounted in radially movable manner on the disc and are arranged to enable engagement of the disc with the chain for transmitting motion from the chainring to said at least one sprocket by means of the chain,
- wherein the transmission further comprises a shifting device for varying the radial position of the meshing devices in order to change the transmission ratio with which the chainring transmits motion to said at least one sprocket,
- wherein each meshing device comprises a support body and a tilting fork which is tiltably supported on the respective support body around a first tilting axis (x') parallel to the axis of rotation (x) of the chainring and comprises at least one tooth for engaging a link of the chain,
- wherein each meshing device further comprises a braking device for preventing the respective tilting fork from tilting around said first tilting axis (x'),
- wherein said braking device comprises, for each meshing device: a first pack of plates carried by the tilting fork so as to be drivingly connected therewith for tilting around said first tilting axis (x') and a second pack of plates mounted on the support body, wherein the plates of at least one of said first and second packs of plates are provided with friction linings,
- a braking member which is supported on the support body for tilting around a third tilting axis (A) normal to said first tilting axis (x') between a first position, in which the braking member does not press the plates of the first pack of plates and the plates of the second pack of plates against each other, and a second position, in which the braking member presses the plates of the first pack of plates and the plates of the second pack of plates against each other so as to prevent the assembly formed by the first pack of plates and the tilting fork from tilting, and a control element operatively connected to the braking member to control movement of the braking member between said first and second positions.

11. The transmission of claim 10, wherein on the braking member of each meshing device a magnet is mounted, which tends to draw the braking member towards the chain link to move the braking member from said first position to said second position.

12. The transmission of claim 10, wherein the control element of each meshing device comprises an elastic spacer arranged to cooperate with the chain to cause movement of the braking member from said first position to said second position when the chain is fully meshed with said at least one tooth of the tilting fork.

* * * * *